(12) United States Patent
Tsai et al.

(10) Patent No.: US 6,893,717 B1
(45) Date of Patent: May 17, 2005

(54) HEAT-TRANSFER LABEL INCLUDING NON-WAX RELEASE COATING

(76) Inventors: Kuolih Tsai, 1841 Highland Oaks Dr., Arcadia, CA (US) 91006; John W. Geurtsen, 286 Chamberlain Rd., Holliston, MA (US) 01746; James S. Nugent, 13 Still Dr., Hudson, MA (US) 01749

(*) Notice: Subject to any disclaimer, the term of this patent is extended or adjusted under 35 U.S.C. 154(b) by 153 days.

(21) Appl. No.: 10/031,144

(22) PCT Filed: Jun. 28, 2000

(86) PCT No.: PCT/US00/17703

§ 371 (c)(1),
(2), (4) Date: Jul. 2, 2002

(87) PCT Pub. No.: WO01/03950

PCT Pub. Date: Jan. 18, 2001

Related U.S. Application Data

(60) Provisional application No. 60/142,728, filed on Jul. 8, 1999.

(51) Int. Cl.[7] .......................... B32B 15/04; B32B 7/12; B44C 1/18
(52) U.S. Cl. ................ 428/352; 428/202; 428/203; 428/343; 428/349; 428/354; 156/239; 156/240; 156/289
(58) Field of Search ............................... 428/352, 202, 428/203, 343, 349, 354, 353; 156/239, 240, 289

(56) References Cited

U.S. PATENT DOCUMENTS 4,319,974 A   3/1982  Crivello
5,314,929 A   5/1994  Crivello et al.
5,800,656 A   9/1998  Geurtsen et al.
6,114,021 A * 9/2000  Pankratz et al. ............ 428/214

FOREIGN PATENT DOCUMENTS

| EP | 819726 | 1/1998 |
|---|---|---|
| EP | 824251 | 2/1998 |
| WO | PCTUS8901731 | 2/1990 |
| WO | PCTUS9202139 | 10/1992 |
| WO | PCTEP9700642 | 8/1997 |

OTHER PUBLICATIONS

Aubrey et al., "Peel Adhesion of Pressure–Sensitive Tapes: Determination of Peel Adhesion with Variation of the Angle of Peeling," J. of the Institution of the Rubber Industry, 3(6):265–9 (1969).

* cited by examiner

Primary Examiner—Terrel Morris
Assistant Examiner—Victor Chang
(74) Attorney, Agent, or Firm—Kriegsman & Kriegsman

(57) ABSTRACT

A heat-transfer label (11) including a non-wax, non-silicone release layer or coating (17) for use in decorating an article, such as a glass container, without leaving a visually discernible release residue on the decorated article. In a preferred embodiment, the label includes a transfer portion (21), the transfer portion comprising a protective lacquer layer (23), an ink design layer (25) over the protective lacquer layer, and a heat-activatable adhesive layer (27) over the ink design and protective lacquer layers. The label also includes a support portion (13), the transfer portion being positioned over the support portion for transfer of the transfer portion from the support portion to an article under conditions of heat and pressure. The support portion comprising a carrier layer (15) and a release layer or coating.

38 Claims, 4 Drawing Sheets

HEAT-TRANSFER LABEL INCLUDING NON-WAX RELEASE COATING

The present application is a 371 of PCT/US00/17703, which claims the benefit under 35 U.S.C. 119(e) of U.S. Provisional Patent Application Ser. No. 60/142,728, filed Jul. 8, 1999, the disclosures of which are incorporated herein by reference.

BACKGROUND OF THE INVENTION

The present invention relates generally to heat-transfer labels and more particularly to heat-transfer labels that include a non-wax release layer or a non-wax release coating.

Heat-transfer labels are commonly used in the decorating and/or labelling of commercial articles, such as, and without limitation to, containers for beverages (including alcoholic beverages, such as beer), essential oils, detergents, adverse chemicals, as well as health and beauty aids. As can readily be appreciated, heat-transfer labels are desirably resistant to abrasion and chemical effects in order to avoid a loss of label information and desirably possess good adhesion to the articles to which they are affixed.

One of the earliest types of heat-transfer label is described in U.S. Pat. No. 3,616,015, inventor Kingston, which issued October, 1971, and which is incorporated herein by reference. In the aforementioned patent, there is disclosed a heat-transfer label comprising a paper sheet or web, a wax release layer affixed to the paper sheet, and an ink design layer printed on the wax release layer. In the heat-transfer labelling process, the label-carrying web is subjected to heat, and the label is pressed onto an article with the ink design layer making direct contact with the article. As the paper sheet is subjected to heat, the wax layer begins to melt. This enables the paper sheet to be released from the ink design layer, with a portion of the wax layer being transferred with the ink design layer onto the article and with a portion of the wax layer remaining with the paper sheet. After transfer of the design to the article, the paper sheet is immediately removed, leaving the design firmly affixed to the article and the wax transferred therewith exposed to the environment. The wax layer is thus intended to serve two purposes: (1) to provide release of the ink design from the web upon application of heat to the web and (2) to form a protective layer over the transferred ink design. After transfer of the label to the article, the transferred wax release layer is typically subjected to a post-flaming technique which enhances the optical clarity of the wax protective layer (thereby enabling the ink design layer therebeneath to be better observed) and which enhances the protective properties of the transferred wax release.

Many heat-transfer labels include, in addition to the layers described above, an adhesive layer (comprising, for example, a polyamide or polyester adhesive) deposited over the ink design to facilitate adhesion of the label onto a receiving article. An example of a heat-transfer label having an adhesive layer is disclosed in U.S. Pat. No. 4,548,857, inventor Galante, which issued Oct. 22, 1985, and which is incorporated herein by reference. Additionally, many heat-transfer labels additionally include a protective lacquer layer interposed between the wax release layer and the ink layer. An example of such a label is disclosed in U.S. Pat. No. 4,426,422, inventor Daniels, which issued Jan. 17, 1984, and which is incorporated herein by reference.

One phenomenon that has been noted with heat-transfer labels of the type described above containing a wax release layer is that, quite often, a degree of hazing or a "halo" is noticeable over the transferred label when the transfer is made onto clear materials. This "halo" effect, which persists despite post-flaming and which may detract from the appearance of the label, is caused by the presence of the wax coating around the outer borders of the transferred ink design layer. Hazing due to the wax release layer may also appear in "open-copy" areas of the label, i.e., areas of the label where no ink is present between the adhesive and protective lacquer layers, and also may detract from the appearance of the label.

In addition to and related to the aforementioned problem of hazing, when heat-transfer labels of the type described above are applied to dark-colored containers, the outer wax layer of the label often appears as a whitish coating on the container, which effect is undesirable in many instances. Furthermore, scratches and similar abrasions to the outer wax layer of the label can occur easily and are readily detectable.

Accordingly, to address the aforementioned issues, considerable effort has been expended in replacing or obviating the need for a wax release layer. One such approach to this problem is disclosed in U.S. Pat. No. 3,922,435, inventor Asnes, which issued Nov. 25, 1975, and which is incorporated herein by reference. In the aforementioned Asnes patent, which relates to a heat-transfer label for objects such as plastic bottles, the customary release layer of wax is replaced with a release layer of a non-wax resin. This non-wax resinous layer is referred to in the Asnes patent as a dry release since it does not transfer to the article along with the ink design layer and is said to comprise a thermoset polymeric resin, such as cross-linked resins selected from the group consisting of acrylic resins, polyamide resins, polyester resins, vinyl resins, epoxy resins, epoxy-acrylate resins, allyl resins, aldehyde resins, such as phenol-formaldehyde resins and the amino-aldehyde resins, e.g., urea formaldehyde or melamine formaldehyde, and combinations thereof.

The heat-transfer label of the foregoing Asnes patent also comprises a clear lacquer layer which is printed onto the release layer, a design print (which may include a number of ink layers) which is printed onto the clear lacquer layer, and a heat-activatable adhesive layer which is printed onto the design print and the clear lacquer layer. The Asnes patent explicitly teaches that "the design print and the adhesive print are both located marginally wholly within the lacquer print. The adhesive layer may be of the same area or larger in area than the design print so long as it is smaller in area than the lacquer print." The Asnes patent also teaches that "it is highly preferred that neither the release layer nor the lacquer layer, at least where they are in contact with each other, contain any substance which is oily or liquid at heat transfer temperature since the oil or liquid, like the wax in wax release layers, will part, leaving some on the lacquer surface and some on the removed release surface."

Another example of a heat-transfer label comprising a non-wax release layer is disclosed in U.S. Pat. No. 4,935,300, inventors Parker et al., which issued Jun. 19, 1990, and which is incorporated herein by reference. In the aforementioned Parker patent, the label, which is said to be particularly well-suited for use on high density polyethylene, polypropylene, polystyrene, polyvinylchloride and polyethylene terephthalate surfaces or containers, comprises a paper carrier web which is overcoated with a layer of thermoplastic polyethylene. A protective lacquer layer comprising a polyester resin and a relatively small amount of a nondrying oil is printed onto the polyethylene layer. An ink design layer comprising a resinous binder base selected from the group consisting of polyvinylchloride, acrylics, polyamides and nitrocellulose is then printed onto the protective lacquer layer. A heat-activatable adhesive layer comprising a thermoplastic polyamide adhesive is then printed onto the ink design layer.

Although the above-described Parker label substantially reduces the wax-related effects discussed previously, said label does not quite possess the same release characteristics of heat-transfer labels containing a wax release layer. In fact, when put to commercial use, the polyethylene release layer of the Parker label was found to become adhesive when subjected to the types of elevated temperatures typically encountered during label transfer. Accordingly, another type of heat-transfer label differs from the Parker heat-transfer label in that a very thin layer or "skim coat" of carnauba wax is interposed between the polyethylene release layer and the protective lacquer layer to improve the release of the protective lacquer from the polyethylene-coated carrier web. The thickness of the skim coat corresponds to approximately 0.1–0.4 lbs. of the wax spread onto about 3000 square feet of the polyethylene release layer. The aforementioned "skim coat-containing" heat-transfer label also differs from the Parker label in that the heat-activatable adhesive of the "skim coat" label is printed over the entirety of the ink and protective lacquer layers, with the peripheral edges of the adhesive layer in direct contact with the wax skim coat.

An example of a "skim coat-containing" heat-transfer label of the type described above is disclosed in U.S. Pat. No. 5,800,656, inventors Geurtsen et al., which issued Sep. 1, 1998, and which is incorporated herein by reference. According to one embodiment, the Geurtsen label is designed for use on silane-treated glass containers of the type that are subjected to pasteurization conditions, the label including a support portion, a skim coat positioned on top of the support portion and a transfer portion positioned on top of the support portion. The support portion includes a sheet of paper overcoated with a release layer of polyethylene. The transfer portion includes an organic solvent-soluble phenoxy resin protective lacquer layer, an organic solvent-soluble polyester resin ink layer over the protective lacquer layer, and a water-dispersible acrylic adhesive resin layer over the ink and protective lacquer layers and onto a surrounding portion of the skim coat.

Although the release properties of heat-transfer labels that include the aforementioned wax skim coat are much improved compared to similar heat-transfer labels lacking said wax skim coat, said labels do result in a portion of the wax skim coat being transferred to the article being decorated during label transfer. As a result, particularly when the labelled article is dark in color, a wax residue is often visible to the naked eye on the article around the peripheries of the label and in open-copy areas of the label. Such a wax residue, for the reasons discussed above, is undesirable from an aesthetic standpoint. In addition, said wax residue precludes the possibility of decorating articles, such as containers, with "wrap-around" labels of the type that completely encircle an object since the adhesive present at the trailing end of the label will not adhere to that portion of the article covered by the wax residue that is deposited with the leading end of the label.

Heat-transfer labels of the type that include the aforementioned wax skim coat are typically heated during the labelling process in order to cause the wax skim coat to soften, thereby facilitating label transfer. However, the heating temperatures needed to soften the wax skim coat have become increasingly more difficult to achieve as new decorating systems are being developed in which bottle throughput is higher and, consequently, the dwell time for heating is shorter, and the actual heating temperatures are lower.

Yet another example of a heat-transfer label comprising a non-wax release layer is disclosed in PCT Appln. No. PCT/US89/01731, inventors Abber et al., which was published Feb. 8, 1990, and which is incorporated herein by reference. In the aforementioned Abber PCT application, a heat-transfer label for application to a plastic bottle or container is described that includes a carrier sheet and a transferable substrate affixed to the carrier sheet. The carrier sheet includes a nonwax thermoset release layer coated over a paper sheet. The nonwax thermoset release layer is a noncellulosic alkyd resin formed by the crosslinking of an alkyd polymer with a methoxy melamine to produce a thermoset release. The alkyd polymer employed is preferably of the type formed by the thermosetting reaction product of a hydroxy-functional polyester with a drying oil. The transferable substrate affixed to the carrier sheet includes a nonwax lacquer transfer layer, an ink design layer over the lacquer transfer layer and a heat-activatable adhesive layer over the ink design layer.

Still another example of a heat-transfer label comprising a non-wax release layer is disclosed in PCT Appln. No. PCT/EP97/00642, inventors Ast, which was published on Aug. 14, 1997, and which is incorporated herein by reference. In the aforementioned Ast PCT application, the release layer is made of polypropylene or polyethylene.

Still yet another example of a heat-transfer label comprising a non-wax release layer is disclosed in European Patent Appln. No. 824,251, inventors Brandt et al., which was published on Feb. 18, 1998, and which is incorporated herein by reference. In the aforementioned Brandt EPO application, there is disclosed a heat-transfer label that is designed for use on a crate and that, once applied to a crate, can easily be removed therefrom in a washing process without the ink dissolving in the wash liquid. The foregoing Brandt label comprises a backing layer and a transfer layer, the transfer layer being releasably attached to the backing layer. The backing layer comprises a polypropylene film coated with a silicone layer. The transfer layer comprises a first containment layer in contact with the silicone layer, an ink layer on top of the first containment layer and marginally wholly within the first containment layer, a second containment layer on top of the ink layer and on top of the first containment layer, the first and second containment layers contacting one another outside the perimeter of the ink layer to form a closed envelope around the ink layer, and an adhesive layer on top of the first and second containment layers, the first containment layer and the adhesive layer contacting one another outside the perimeter of the second containment layer to form a closed envelope around the ink layer and second containment layer.

Unfortunately, the use of silicone as a release coating, as in the preceding example, presents certain problems or shortcomings. One of these problems is the difficulty of printing a label on a silicone release. Other possible problems or shortcomings are set forth in U.S. Pat. No. 5,314,929, inventors Crivello et., which issued May 24, 1994, and which is incorporated herein by reference. In the aforementioned Crivello patent, there is disclosed a silicone-free release coating composition adapted for use with adhesive tapes, said silicone-free coating composition being said to be rapidly curable and comprising (a) between about 50 and about 95 wt % of an alkyl vinyl ether monomer having the formula $C_nH_{2n+1}O-CH-CH_2$ wherein n has a value of from 8 to 20, optionally containing a cationically polymerizable comonomer; (b) between about 5 and about 50 wt % of a multifunctional vinyl ether monomer and (c) between about 0.1 and about 10 wt % of an onium salt photoinitiator.

It is to be noted that the aforementioned Crivello patent neither teaches nor suggests the use of its release composition as a release coating in a heat-transfer label.

SUMMARY OF THE INVENTION

It is an object of the present invention to provide a heat-transfer label that includes a novel release layer or release coating.

It is another object of the present invention to provide a heat-transfer label as described above whose release layer or release coating overcomes at least some of the problems associated with many of the heat-transfer label release layers or coatings described above.

It is still another object of the present invention to provide a heat-transfer label as described above whose release layer or release coating does not transfer, to any discernible degree observable to the naked eye, with the transfer portion of the label onto the article that is being labelled.

In furtherance of the above and other objects to be set forth or to become apparent from the description to follow, and according to one aspect of the invention, there is provided a heat-transfer label, said heat-transfer label comprising:

(a) a transfer portion, said transfer portion comprising
  (i) an ink design layer, and
  (ii) a heat-activatable adhesive layer over said ink design layer; and
(b) a support portion, said transfer portion being positioned over said support portion for transfer of the transfer portion from the support portion to an article under conditions of heat and pressure, said support portion comprising
  (i) a carrier, and
  (ii) a release coating positioned over said carrier, said release coating being made of a non-wax, non-silicone, thermoset release material, said release coating separating cleanly from said transfer portion with no visually discernible portion of said release coating being transferred to the article along with said transfer portion, said release coating having a total surface energy of about 25 to 35 mN/m (preferably about 30 mN/m), of which about 0.1 to 4 mN/m (preferably about 1.3 mN/m) is polar surface energy.

Said release coating preferably has a thickness of about 0.01 to 10 microns, more preferably about 0.02 to1 micron, even more preferably about 0.1 micron. In addition, when analyzed by XPS (X-ray photoelectron spectroscopy), said coating preferably has a carbon content (by atomic %) of about 90 to 99.9% (preferably about 97%) and an oxygen content (by atomic %) of about 0.1 to 10% (preferably about 3%). Accordingly, said coating is predominantly a hydrocarbon in terms of its chemical makeup.

An example of the present support portion is a coated film structure preferably comprising:

(i) polymers selected from the group consisting of polyesters such as polyethylene terephthalate, polyethylene napthylene; polyolefins such as polyethylene and polypropylene; and polyamides; wherein said polymers form a polymeric film surface; and
(ii) a primer coating comprising:
  (A) functionalized α-olefin containing copolymers, preferably acid functionalized α-olefin containing copolymers, selected from the group consisting of ethylene/acrylic acid copolymers; ethylene/methacrylic acid copolymers; ethylene/vinylacetate/acrylic acid terpolymers; ethylene/methacrylamide copolymers; ethylene/glycidyl methacrylate copolymers; ethylene/dimethylaminoethyl methacrylate copolymers; ethylene/2-hydroxyethyl acrylate copolymers; propylene/acrylic acid copolymers; etc. and
  (B) crosslinking agents selected from the group consisting of amino formaldehyde resins, polyvalent metal salts, isocyanates, blocked isocyanates, epoxy resins and polyfunctional aziridines;
(iii) wherein said primer coating is applied as a primer to the polymeric film surface, preferably in its amorphous or semi-oriented state and reacted with newly generated polymeric film surfaces formed during uniaxial or biaxial stretching and heat setting.

Preferably, the above-mentioned transfer portion further comprises a protective lacquer layer, said ink design layer being positioned over said protective lacquer layer, said heat-activatable adhesive layer extending beyond the peripheries of said ink design layer and said protective lacquer layer. The release layer of the aforementioned support portion is preferably in direct contact with the transfer portion thereof; more preferably, the release layer is in direct contact with each of the protective lacquer layer and the periphery of the heat-activatable adhesive layer.

The heat-activatable adhesive layer of the foregoing heat-transfer label preferably comprises a polyester resin and more preferably additionally comprises an anti-blocking agent, such as a paraffinic wax. The protective lacquer layer of the foregoing heat-transfer label preferably comprises a phenoxy resin, more preferably a cross-linked phenoxy resin. The ink design layer of the foregoing heat-transfer label preferably comprises a polyester resin.

According to another aspect of the invention, there is provided a heat-transfer label comprising:

(a) a transfer portion, said transfer portion comprising
  (i) an ink design layer, and
  (ii) a heat-activatable adhesive layer over said ink design layer; and (b) a support portion, said transfer portion being positioned over said support portion for transfer of the transfer portion from the support portion to an article under conditions of heat and pressure, said support portion comprising
  (i) a carrier, and
  (ii) a release coating positioned over said carrier, said release coating being made of a non-wax, non-silicone, thermoset release material, said release coating separating cleanly from said transfer portion with no visually discernible portion of said release coating being transferred to the article along with said transfer portion, said release coating having a carbon content (by atomic %) of about 90 to 99.9% (preferably about 97%) and an oxygen content (by atomic %) of about 0.1 to 10% (preferably about 3%), as measured by X-ray photoelectron spectroscopy.

The present invention is also directed to a method of decorating an article, such as a clear glass container, said method comprising in one aspect the steps of (a) providing a heat-transfer label, said heat-transfer label comprising:
  (i) a transfer portion, said transfer portion comprising
    (A) an ink design layer, and
    (B) a heat-activatable adhesive layer over said ink design layer, and (ii) a support portion, said transfer portion being positioned over said support portion for transfer of the transfer portion from the support portion to a glass article under conditions of heat and pressure, said support portion comprising
(A) a carrier, and
(B) a release layer positioned over said carrier, said release layer being made of a non-wax, non-silicone, thermoset release material, said release layer separating cleanly from said transfer portion with no visually discernible portion of said release layer being transferred to the glass article along with said transfer portion, said release layer having a total surface energy of about 25 to 35 mN/m (preferably about 30 mN/m), of which about 0.1 to 4 mN/m (preferably about 1.3 mN/m) is polar surface energy; and
(b) transferring said transfer portion from said support portion onto the article.

Said release coating preferably has a thickness of about 0.01 to 10 microns, more preferably about 0.02 tol micron, even more preferably about 0.1 micron. In addition, when analyzed by XPS (X-ray photoelectron spectroscopy), said coating preferably has a carbon content (by atomic %) of about 90 to 99.9% (preferably about 97%) and an oxygen content (by atomic %) of about 0.1 to 10% (preferably about 3%). Accordingly, said coating is predominantly a hydrocarbon in terms of its chemical makeup.

An example of the present support portion is the above-described coated film structure.

The present invention is also directed to a method of decorating an article, such as a clear glass container, said method comprising in another aspect the steps of:

(a) providing a heat-transfer label, said heat-transfer label comprising:
(i) a transfer portion, said transfer portion comprising
(A) an ink design layer, and
(B) a heat-activatable adhesive layer over said ink design layer, and
(ii) a support portion, said transfer portion being positioned over said support portion for transfer of the transfer portion from the support portion to a glass article under conditions of heat and pressure, said support portion comprising
(A) a carrier, and
(B) a release layer positioned over said carrier, said release layer being made of a non-wax, non-silicone, thermoset release material, said release layer separating cleanly from said transfer portion with no visually discernible portion of said release layer being transferred to the glass article along with said transfer portion, said release layer having a carbon content (by atomic %) of about 90 to 99.9% (preferably about 97%) and an oxygen content (by atomic %) of about 0.1 to 10% (preferably about 3%), as measured by X-ray photoelectron spectroscopy; and
(b) transferring said transfer portion from said support portion onto the article.

The present invention is also directed to a transfer label, said transfer label differing from the above-described heat-transfer label in that a pressure-sensitive adhesive is used in place of the above-described heat-activatable adhesive.

For purposes of the present specification and claims, it is to be understood that certain terms used herein, such as "on" or "over," when used to denote the relative positions of two or more layers of a heat-transfer label, are primarily used to denote such relative positions in the context of how those layers are situated prior to transfer of the transfer portion of the label to an article since, after transfer, the arrangement of layers is inverted as those layers which were furthest removed from the associated support sheet are now closest to the labelled article.

Additional objects, as well as features, advantages and aspects of the present invention, will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description, is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts.

DETAILED DESCRIPTION OF PREFERRED EMBODIMENTS

Figure 1:
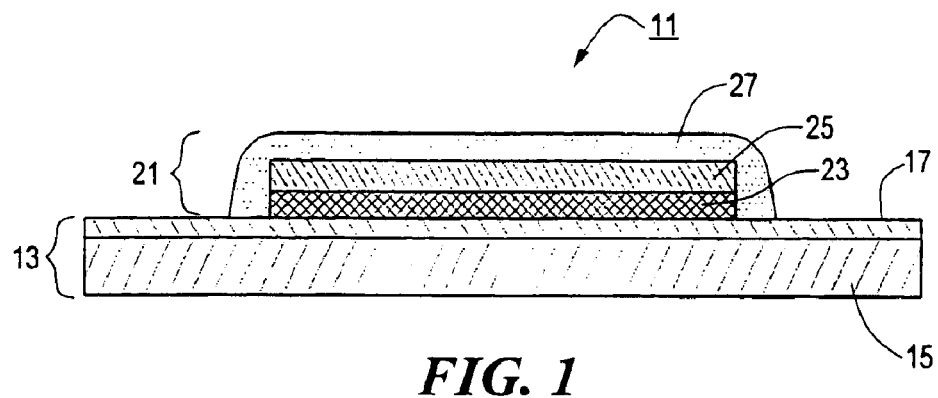
FIG. 1 is a schematic section view of one embodiment of a heat-transfer label constructed according to the teachings of the present invention.

Referring now to FIG. 1, there is shown a schematic section view of one embodiment of a heat-transfer label constructed according to the teachings of the present invention, said heat-transfer label being represented generally by reference numeral 11.

Label 11 comprises a support portion 13. Support portion 13, in turn, comprises a carrier 15. Carrier 15 preferably is a polymeric film selected from the group consisting of polyesters, such as polyethylene terephthalate, polyethylene napthylene; polyolefins, such as polyethylene and polypropylene; and polyamides.

More preferably, carrier 15 is a clear plastic film of the type described above. As can readily be appreciated, one benefit to using a clear material as carrier 15 is that, if desired, one can inspect the quality of the printed matter of the label by looking at said printed matter through carrier 15

(from which perspective said printed matter appears as it will on the labelled article), as opposed to looking at said printed matter through the adhesive layer of the label (from which perspective said printed matter appears as the mirror image of what will appear on the labelled article).

A particularly preferred plastic material for use as carrier 15 is a clear polyester film, such as a clear polyethylene terephthalate (PET) film. This is because, at least as compared to some other plastic materials like polyethylene and polypropylene, polyester is a strong plastic material and makes a good substrate to be printed onto. In addition, unlike polyethylene, polyester does not tend to soften and become tacky at the types of temperatures typically encountered during heat-transfer. Typically, carrier 15 has a thickness of about 1–2 mil.

Support 13 also includes a release layer or coating 17, coating 17 preferably being applied directly on top of carrier 15. Coating 17 is a thermoset release material that separates cleanly from the below-described transfer portion of label 11 and is not transferred, to any visually discernible degree, with said transfer portion of label 11 onto an article being labeled. (For purposes of the present specification land claims, the term "visually discernible" is to be construed in terms of an unaided, or naked human eye.) Preferably, release coating 17 is clear for the same types of reasons given above in connection with carrier 15.

Coating 17 does not contain any waxes or any silicones, except to the limited extent provided below, and the terms "non-wax" and "non-silicone," when used in the present specification and claims to describe and to define the present release layer or coating, are defined herein to exclude from said release layer or coating the presence of any and all waxes and silicones not encompassed by the limited exceptions provided below.

Coating 17 preferably has a thickness of about 0.01 to 10 microns, more preferably about 0.02 tol micron, even more preferably about 0.1 micron. In addition, coating 17 preferably has a total surface energy of about 25 to 35 mN/m (preferably about 30 mN/m), of which about 0.1 to 4 mN/m (preferably about 1.3 mN/m) is polar surface energy. Furthermore, when analyzed by XPS (X-ray photoelectron spectroscopy), coating 17 preferably has a carbon content (by atomic %) of about 90 to 99.9% (preferably about 97%) and an oxygen content (by atomic %) of about 0.1 to 10% (preferably about 3%). Accordingly, coating 17 is predominantly a hydrocarbon in its chemical makeup.

An example of a coated polymer film suitable for use as support 13 of the present invention is available from DuPont Corp. (Wilmington, Del.) as product number 140AXM 701 (140 gauge coated polyester film). Other coated polymer films which may be used as support 13 are described in European Patent Application No. 819,726, published Jan. 21, 1998, which document is incorporated herein, by reference. The aforementioned European patent application teaches a coated film structure preferably comprising:

(i) polymers selected from the group consisting of polyesters such as polyethylene terephthalate, polyethylene napthylene; polyolefins such as polyethylene and polypropylene; and polyamides; wherein said polymers form a polymeric film surface; and (ii) a primer coating comprising:

(A) functionalized α-olefin containing copolymers, preferably acid functionalized α-olefin containing copolymers, selected from the group consisting of ethylene/acrylic acid copolymers; ethylene/methacrylic acid copolymers; ethylene/vinylacetate/acrylic acid terpolymers; ethylene/methacrylamide copolymers; ethylene/glycidyl methacrylate copolymers; ethylene/dimethylaminoethyl methacrylate copolymers; ethylene/2-hydroxyethyl acrylate copolymers; propylene/acrylic acid copolymers; etc. and (B) crosslinking agents selected from the group consisting of amino formaldehyde resins, polyvalent metal salts, isocyanates, blocked isocyanates, epoxy resins and polyfunctional aziridines;

(iii) wherein said primer coating is applied as a primer to the polymeric film surface, preferably in its amorphous or semi-oriented state and reacted with newly generated polymeric film surfaces formed during uniaxial or biaxial stretching and heat setting.

Although the above-described polymeric film surface is preferably formed of a polyester, a polyolefin, or a polyamide, it may be formed form any material capable of being formed into a sheet or film. The polymeric film surface should be capable of binding or reacting with an acid-functionalized α-olefin copolymer to form a modified film base.

The above-mentioned polymer films can be manufactured by an extrusion process, such as a cast film or blown film process. In a cast film process, the polymer resin is first heated to a molten state and then extruded through a wide slot die in the form of an amorphous sheet. The sheet-like extrudate is rapidly cooled or "quenched" to form a cast sheet of polyester by contacting and traveling partially around a polished, revolving casting drum. Alternatively, the extrudate can be blown in a conventional blown film process. Regardless of the process, however, the polyester sheet is preferably uniaxially or biaxially (preferably biaxially) stretched in the direction of film travel (machine direction) and/or perpendicular to the machine direction (traverse direction), while being heated to a temperature in the range of from about 80° C. to 160° C., preferably about 90° C. to 110° C., the degree of stretching may range from 3.0 to 5.0 times the original cast sheet unit dimension, preferably from about 3.2 to about 4.2 times the original cast sheet dimension. Reaction with the newly generated polymer film surfaces formed during stretching preferably occurs at temperatures about 130° C. or higher.

Additives such as coating aids, wetting aids such as surfactants (including silicone surfactants), slip additives, antistatic agents can be incorporated into the primer coating in levels from 0 to 50% based on the total weight of additive-free coating solids.

The above-described primer coating may additionally be applied to the bottom surface of the polymeric film for use in preventing the adhesive layer of a transfer portion from adhering to the underside of carrier 15 when a label assembly comprising a plurality of transfer portions on a single support portion 13 is wound into a roll.

Label 11 further comprises a transfer portion 21 (it being understood that a plurality of transfer portions 21 may be spaced apart on a single support portion 13). Transfer portion 21, in turn, preferably includes (i) a protective lacquer layer 23 printed directly on top of a desired area of release layer 17, (ii) an ink design layer 25 printed directly onto a desired area of lacquer layer 23, and (iii) a heat-activatable adhesive layer 27 printed directly onto ink design layer 25, any exposed portions of lacquer layer 23 and a surrounding area of release layer 17.

Where the article being labeled is a glass article, such as a silane-treated glass container, protective lacquer layer 23 preferably is a phenoxy protective lacquer layer, such as that described in U.S. Pat. No. 5,800,656, or is a cross-linked phenoxy lacquer layer such as that disclosed in U.S. patent application Ser. No. 09/093,150, which is incorporated herein by reference. This is because phenoxy protective lacquer layers tend to possess the high degree of scuff resistance and chemical resistance preferred for glass articles. It should be understood, however, that release layer 17 releases well from a variety of protective lacquer layers of different compositions and that other types of protective lacquer resins may also be suitable for use in layer 23 depending upon the type of article being labeled and the use to which the decorated article is to be put.

Examples of phenoxy lacquer resins suitable for use in the aforementioned phenoxy or cross-linked phenoxy protective lacquer layer include the PAPHEN Phenoxy Resins (Phenoxy Specialties, Rock Hill, S. C.—a division of InChem Corp.), which have the following chemical structure:

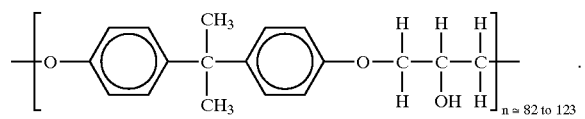

A particularly preferred PAPHEN Phenoxy Resin is PKHH, a medium weight grade of the above structure which, at 40% solids, by weight, in methyl ethyl ketone (MEK), has a solution viscosity of 4500 to 7000 mPa·s(cP). Examples of a suitable cross-linker for cross-linking the aforementioned phenoxy resin include partially methylated melamine-formaldehyde resins of the type present in the CYMEL 300 series of partially methylated melamine-formaldehyde resin solutions (Cytec, Industries, Inc., West Paterson, N. J.) and, in particular, CYMEL 370 partially methylated melamine-formaldehyde resin solution (88±2% nonvolatiles, iBuOH solvent). Preferably, the solids of the aforementioned CYMEL 370 resin solution constitute no more than about 5%, by weight, of lacquer layer 23 (with the remainder of lacquer layer 23 being the aforementioned phenoxy resin) since amounts of CYMEL 370 in excess thereof may cause lacquer layer 23 to become tacky.

To form a cross-linked phenoxy lacquer layer 23, a lacquer composition comprising the above-identified phenoxy lacquer resin, a suitable cross-linker and one or more suitable volatile solvents are deposited onto a desired area of release layer 17, preferably by gravure printing or a similar technique. After deposition of the lacquer composition onto the desired area of layer 17, the volatile solvent(s) evaporate(s), leaving only the non-volatile components thereof to make up lacquer layer 23. In a preferred embodiment, the lacquer composition comprises about 20%, by weight, PKHH; about 1%, by weight, CYMEL 370 resin solution; about 59%, by weight, methyl ethyl ketone; and about 20%, by weight, toluene.

Ink design layer 25 of transfer portion 21, which layer may actually comprise either a single ink layer or a plurality of ink layers, may be made using one or more conventional inks, such as polyester inks, polyester/vinyl inks, polyamide inks and/or acrylic inks, as well as the phenoxy ink described in commonly-assigned, co-pending U.S. Ser. No. 09/204,424, which is incorporated herein by reference. Such inks typically comprise a resin of the type described above, a suitable pigment or dye, and one or more suitable volatile solvents. Ink design layer 25 is formed in the conventional manner by depositing, preferably by gravure printing, one or more ink compositions of the type described above onto one or more desired areas of lacquer layer 23 and, thereafter, allowing the volatile solvent(s) of the ink composition(s) to evaporate, leaving only the non-volatile ink components to form layer 25.

An example of polyester ink suitable for use in forming layer 25 comprises 18 wt % ViTEL® 2700 (a copolyester resin commercially available from Bostik, Middleton, Mass., having a high tensile strength (6700 psi) and a low elongation (3% elongation)), 6 wt % pigment, 30.4 wt % n-propyl acetate and 45.6 wt % toluene. An example of another suitable polyester ink comprises ViTEL® 2300 polyester resin (a copolyester resin also commercially available from Bostik having a high tensile strength (8000 psi) and a low elongation (7% elongation)).

Adhesive layer 21 preferably comprises a heat-activatable, polyester-based adhesive; however, other types of heat-activatable adhesives, such as water-based acrylic adhesives (see, for example, U.S. Ser. No. 09/093,153, which application is incorporated herein by reference), phenoxy adhesives (ee for example, U.S.S N. 09/189,277, which application is incorporated herein by reference) and the like, are also suitable for use as layer 27. (In fact, certain pressure-sensitive adhesives may also be used, instead of heat-activatable adhesives, in forming adhesive layer 27.) Adhesive layer 27 is preferably formed by depositing, by gravure printing or the like, onto (i) ink layer 25, (ii) exposed portions of lacquer layer 23 and (iii) a surrounding area of release coating 17 an adhesive composition comprising an adhesive resin and one or more volatile solvents and then evaporating the volatile component(s) of the composition (for example, by oven-heating for 30 seconds at 200° F.), leaving only the non-volatile solid component(s) thereof to form layer 27.

An example of a suitable polyester-based adhesive composition for use in forming a polyester-based adhesive of the type mentioned above comprises about 10.7 wt % of ViTEL® 2700 polyester resin, about 10.7 wt % of ViTEL® 2300, about 1.1 wt % of BENZOFLEX® S404 glyceryl tribenzoate plasticizer (commercially available from Velsicol Chemical Corporation, Chicago, Ill.), about 1.1 wt % HULS 512 adhesion promoter (commercially available from Sivento Inc., Piscataway, N. J.), about 19.20 wt % toluene and about 57.10 wt % methyl ethyl ketone.

Adhesive layer 27 may additionally include an anti-blocking agent for use in preventing adhesive layer 27 from adhering to the underside of carrier 15 when a label assembly comprising a plurality of transfer portions 21 on a single support portion 13 is wound into a roll. The inclusion of said anti-blocking agent in said adhesive may be particularly desirable in those instances in which adhesive layer 27 and carrier 15 have a high degree of adherence to one another, such as where adhesive layer 27 comprises a polyester-based adhesive and carrier 15 is a polyester film. An example of a suitable anti-blocking agent is a wax, such as a paraffinic wax, which is added to the adhesive composition used to form adhesive layer 27 in an amount constituting about 1 wt % of said composition.

As seen in the examples below, in those instances in which a wax is included in adhesive layer 27, a percentage of said wax is believed to migrate to other layers of label 11, including to the interface between release layer 17 and protective lacquer layer 23.

Moreover, as also seen in the examples below, said wax migration appears to improve the release of protective lacquer layer 23 and adhesive layer 27 from release layer 17. Nevertheless, notwithstanding the presence of said minute quantities of wax at the surface of release layer 17, the present inventors did not detect any visually discernible amount of wax that was transferred from the release layer to the labeled article. Any such quantities of migrated wax do not render a release layer of the present invention outside the meaning of the term "non-wax."

Label 11 may be used in the conventional manner by contacting adhesive layer 27 with a desired article, such as a pre-heated (preferably to about 275–300° F.), silane-treated clear glass container, while applying sufficient heat to the bottom of carrier 15 (e.g., using a platen heated to about 300–350° F.) so as to cause transfer portion 21 to be released from support portion 13 and so as to cause adhesive layer 27 to become heat-activated for bonding to the desired article. Prior to label transfer, the label construction is preferably pre-heated sufficiently so that the adhesive layer is heated to about 170–250° F.

The present inventors have noted that, when label 11 is used to decorate silane-treated, clear glass containers, a good degree of label adherence and scuff resistance is achieved (i.e., at least about 5H pencil hardness, as measured by ASTM standard D3363-92a for film hardness on a substrate).

One of the advantages associated with the use of a release layer like release layer 17 is that transfer portion 21 of label 11 can be of the "wrap-around" variety that completely encircles a container.

The present invention may more clearly be understood by reference to the following examples, it being understood that such examples are illustrative and not to be considered as limiting of the invention.

EXAMPLE 1

Four heat-activatable adhesive or protective lacquer films were coated onto each of two types of coated polyethylene terephthalate (PET) film samples (DuPont 92AXT coated polyester film), said two types of coated PET film samples being similar to DuPont 140AXM 701 coated polyester film (and differing most notably from DuPont 140AXM 701 coated polyester film in that the two coated PET film samples comprised 92 gauge PET film, instead of 140 gauge PET film). The first of said adhesive or protective films applied to said two coated PET film samples was a polyester adhesive obtained by (i) depositing onto the coated PET film an adhesive composition comprising about 10.7 wt % of ViTEL® 2700 polyester resin, about 10.7 wt % of ViTEL® 2300, about 1.1 wt % of BENZOFLEX® S404 glyceryl tribenzoate plasticizer, about 1.1 wt % HULS 512 adhesion promoter, about 19.20 wt % toluene and about 57.10 wt % methyl ethyl ketone and (ii) drying the resulting product at 70° C. for 5 minutes to evaporate the volatile components thereof. The second of said films was an acrylic adhesive (see U.S.S. N. 09/093,153, which is incorporated herein by reference) obtained by (i) depositing onto the coated PET film an adhesive composition comprising about 75 wt % of RHOPLEX® GL-618 emulsion, about 17.5 wt % isopropyl alcohol, about 7.5 wt % of a 4% solution of NH$_4$OH, and about 1 wt % of Triton GR-5M dioctyl sodium sulfosuccinate surfactant and (ii) drying the resulting product at 70° C. for 5 minutes to evaporate the volatile components thereof. The third of said films was a water-based phenoxy adhesive (see U.S. Ser. No. 09/189,277, which is incorporated herein by reference) obtained by (i) depositing onto the coated PET film an adhesive composition comprising about 34 wt % PAPHEN® PKHW-34 phenoxy dispersion, about 12 wt % of co-solvent (24% butanol, 5–7% propylene glycol n-propyl ether and 1–3% dimethyl ethyl amine), and about 54 wt % water and (ii) drying the resulting product at 70° C. for 5 minutes to evaporate the volatile components thereof.

The fourth of said films was a solvent-based phenoxy protective lacquer obtained by (i) depositing onto the coated PET film an adhesive composition comprising about 25 wt % PKHH, about 46.6 wt % methyl ethyl ketone, about 23.4 wt % toluene and about 5 wt % Dowanol PM propylene glycol methylether and (ii) drying the resulting product at 70° C. for 5 minutes to evaporate the volatile components thereof.

The four films were removed from each of the two types of coated PET samples, and the film surfaces from each coated PET sample that contacted the sample were analyzed by XPS to determine whether there was any release material contamination from the samples on the film surfaces. Areas from the two types of coated PET samples which were not coated by film were also analyzed by XPS as control samples. The results are shown below in TABLE I.

TABLE I

| Sample | Atomic % | | | | |
|---|---|---|---|---|---|
| | C | O | Na | N | S |
| Uncoated Sample 1 | 97.6 | 2.4 | — | — | — |
| Phenoxy Protective Lacquer from Sample 1 | 85.4 | 14.6 | — | — | — |
| Phenoxy Adhesive from Sample 1 | 83.5 | 16.5 | — | — | — |
| Polyester Adhesive from Sample 1 | 80.4 | 19.6 | — | — | — |
| Acrylic Adhesive from Sample 1 | 71.2 | 22.9 | 0.5 | 4.2 | 1.2 |
| Uncoated Sample 2 | 96.3 | 3.7 | — | — | — |
| Phenoxy Adhesive from Sample 2 | 82.7 | 17.2 | — | — | — |
| Polyester Adhesive from Sample 2 | 79.8 | 20.2 | — | — | — |
| Acrylic Adhesive from Sample 2 | 69.7 | 23.6 | 0.8 | 4.6 | 1.3 |

XPS measurements of the coated surfaces of the two types of coated PET samples showed 97.6% carbon/2.4% oxygen and 96.3% carbon/3.7% oxygen, respectively. This is consistent with a predominantly hydrocarbon surface. The surface compositions of the four films deposited onto the two types of coated PET samples showed no significant change after having been peeled from the two types of coated PET samples. This indicates that the adhesive/protection layers were free of contamination from the support.

EXAMPLE 2

Figure 2:
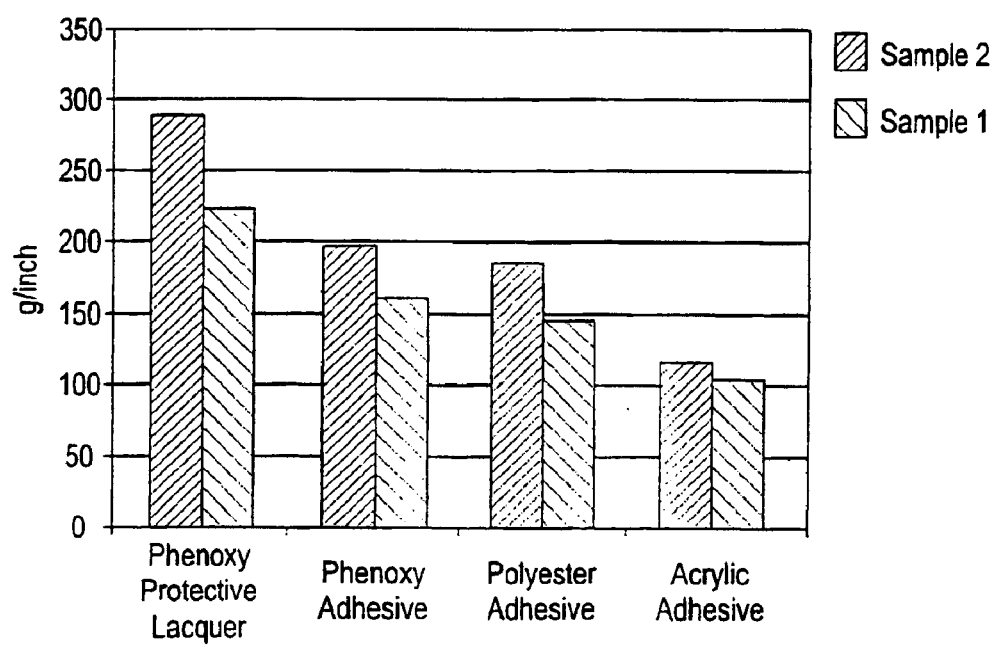
FIG. 2 is a graph depicting the release values obtained in Example 2.

The four types of heat-activatable adhesive or protective lacquer films described in Example 1 were formed on each of the two types of coated PET support samples of Example 1, and the respective release values for each were measured with a TLMI Release Tester (see FINAT Test Method No. 3 of the FINAT Technical Handbook, 41 Edition) at a peel angle of 15 degrees using 810 tape at a peel rate of 12 in/min at room temperature. The results are shown below in TABLE II and are depicted graphically in FIG. 2.

TABLE II

| Sample | Release Value (g/in) | Average (g/in) |
|---|---|---|
| Phenoxy protective lacquer on Sample 2 | 297, 335, 295, 268, 296, 293, 296, 243 | 290 |
| Phenoxy adhesive on Sample 2 | 215, 181, 212, 192, 188, 201, 191, 211, 195 | 198 |
| Polyester adhesive on Sample 2 | 162, 162, 174, 173, 158, 197, 188 | 173 |
| Acrylic adhesive on Sample 2 | 117, 116, 119, 99, 130 | 116 |
| Phenoxy protective lacquer on Sample 1 | 224, 221, 218, 229, 243, 223, 219, 218 | 224 |
| Phenoxy adhesive on Sample 1 | 169, 149, 144, 158, 154, 159, 172, 172 | 159 |
| Polyester adhesive on Sample 1 | 166, 123, 118, 144, 142, 164, 154 | 144 |
| Acrylic adhesive on Sample 1 | 120, 93, 99, 103, 104, 99 | 103 |

The average release values for Sample 2 were higher than that for Sample 1. It is believed that this higher release force is attributable to the higher oxygen content in Sample 2 than in Sample 1 (3.7% vs. 2.4% as detected by XPS).

EXAMPLE 3

Figure 3:
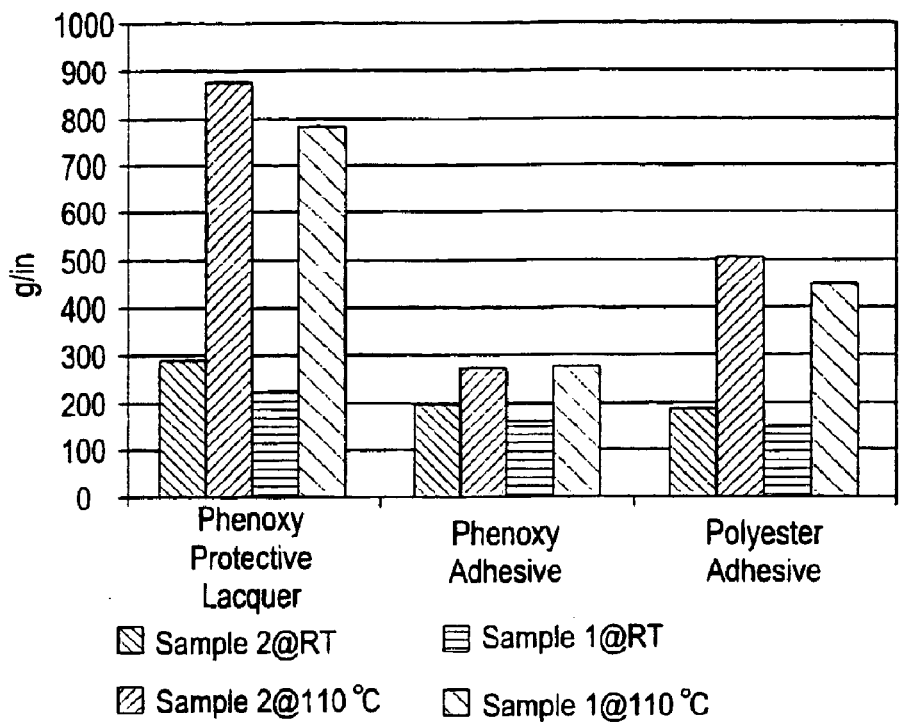
FIG. 3 is a graph depicting the release values obtained in Example 3.

The phenoxy protective lacquer, phenoxy adhesive and polyester adhesive films described in Example 1 were formed on each of the two types of support samples of Example 1, and the respective release values for each were measured, as in Example 2, with a 15 degree tester with 810 tape at 12 in/min (i) at room temperature (R.T.) and (ii) at room temperature after heating at 110° C. for 20 minutes (110° C.). The results are shown below in TABLE III and are depicted graphically in FIG. 3.

TABLE III

| | RELEASE VALUES (g/in) | | | |
|---|---|---|---|---|
| | Sample 2 at R.T. | Sample 2 at 110° C. | Sample 1 at R.T. | Sample 1 at 110° C. |
| Phenoxy Protective Lacquer | 290 | 876 | 224 | 784 |
| Phenoxy Adhesive | 198 | 272 | 159 | 277 |
| Polyester Adhesive | 188 | 504 | 144 | 448 |

The above data indicates that the phenoxy protective lacquer experienced the biggest heat-related release increase among the three films while the phenoxy adhesive experienced the smallest release increase. The 20-minute heating was used to simulate severe aging conditions for a label. In reality, a label experiences heat at 110° C. for less than a second.

EXAMPLE 4

Figure 4:
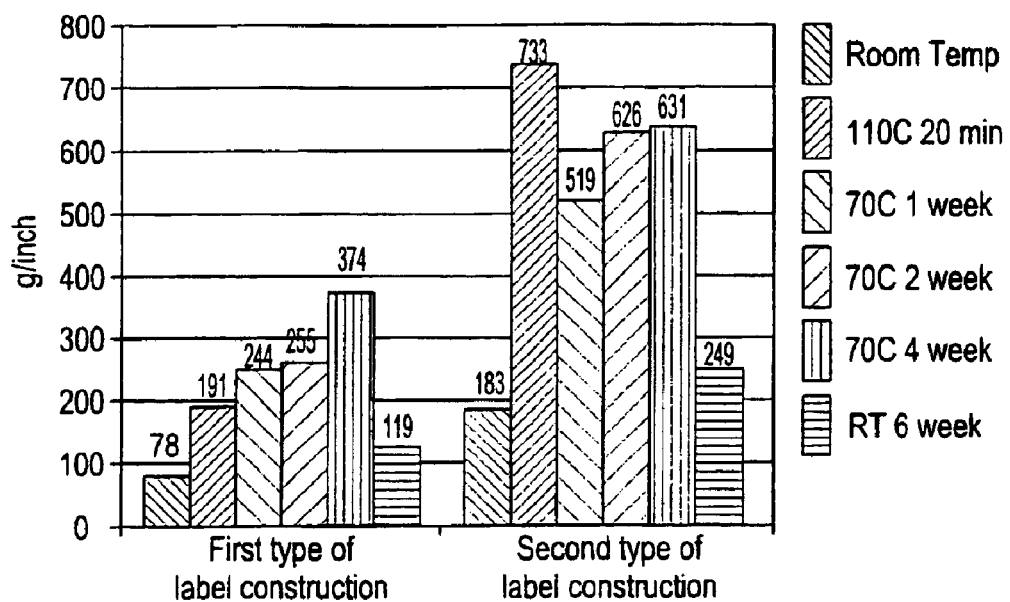
FIG. 4 is a graph depicting the release values obtained in Example 4.

A plurality of samples of a first type of label construction were prepared, said first type of label construction comprising a Sample 1-type support, a phenoxy protective lacquer layer of the type described above printed on top of said support, an ink layer printed on top of said protective lacquer layer, and a polyester adhesive of the type described above comprising a paraffinic wax printed on top of said support, said protective lacquer layer and said ink layer. In addition, a plurality of samples of a second type of label construction were prepared, said second type of label construction differing from said first type of label construction in that said second label construction did not include an adhesive layer. Six samples of each type of label construction were tested one week after printing using the above-described 15 degree release test at room temperature. These samples were identified as "Room Temp." Another six samples of each were tested after heating at 110° C. for. 20 minutes. These samples were identified as "110C/20 min." Additional batches of six samples of each label construction were heated in a 70° C. oven for 1, 2 and 4 weeks, respectively, with adhesive side up to prevent blocking and then tested. These samples were identified as "70C/1 week," "70C/2 week," and "70C/4 week." Still another six samples of each label construction were stored at room temperature for six weeks and then tested. These samples were identified as "RT 6." The release values obtained (g/inch) from the above-described testing are set forth below in TABLE IV and are shown graphically in FIG. 4.

TABLE IV

| Construction | Room Temp. | 110 C./ 20 min | 70 C./ 1 week | 70 C./ 2 week | 70 C./ 4 week | RT/6 |
|---|---|---|---|---|---|---|
| First type | 78 | 191 | 244 | 255 | 374 | 119 |
| Second type | 183 | 733 | 519 | 626 | 631 | 249 |

As can be seen, the heat-aged condition increased the release value for both types of label constructions.

EXAMPLE 5

Figure 5:
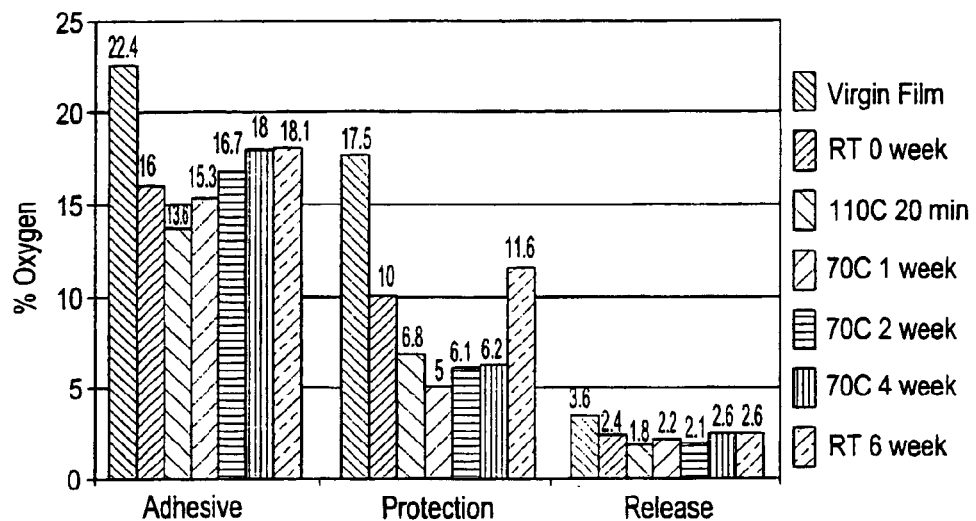
FIG. 5 is a graph depicting the surface oxygen content values obtained by X-ray photoelectron spectroscopy (XPS) in Example 5.

XPS measurements were obtained for the adhesive layer, the protective lacquer layer and the release coating of the support portion of the first type of label construction described in Example 4. The oxygen % values from these measurements are set forth below in TABLE V and are depicted graphically in FIG. 5. (Virgin film denotes the surface of the adhesive or protective lacquer material cast on a substrate or the virgin release coating without any material contamination.)

TABLE V

| | Virgin film | Room Temp | 110C/2 0 min | 70C/1 week | 70C/2 week | 70C/4 week | RT/6 |
|---|---|---|---|---|---|---|---|
| Adhesive | 22.4 | 16.0 | 13.6 | 15.3 | 16.7 | 18.0 | 18.1 |
| Protective | 17.5 | 10.0 | 6.8 | 5.0 | 6.1 | 6.2 | 11.6 |
| Release | 3.6 | 2.4 | 1.8 | 2.2 | 2.1 | 2.6 | 2.6 |

As can be seen from the above data, the wax from the adhesive layer migrated to the protective lacquer and release layers.

EXAMPLE 6

Figure 6:
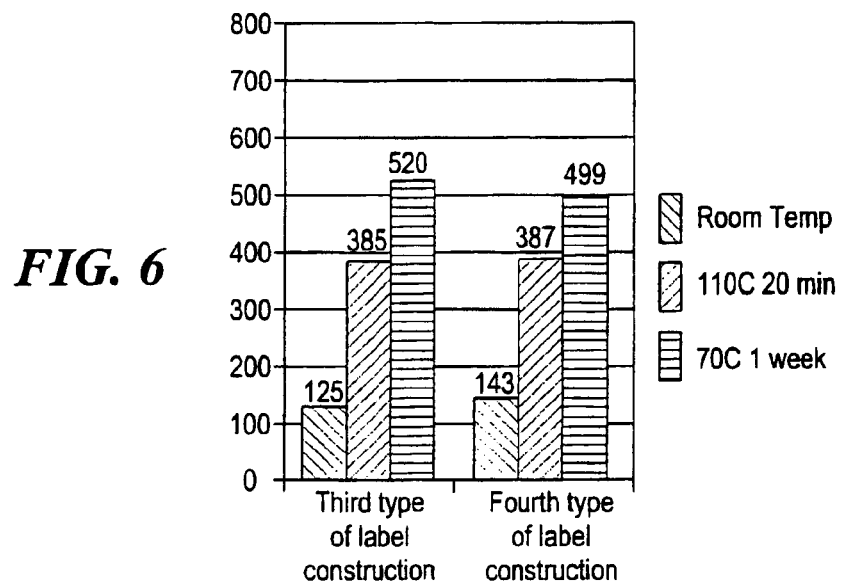
FIG. 6 is a graph depicting the release values obtained in Example 6.

A plurality of samples of a third type of label construction were prepared, said third type of label construction differing from said first type of label construction in that the support used was similar, but not identical, to the support used in the first type of label construction and in that the adhesive used was the polyester adhesive of Example 1 (which does not include a paraffinic wax or the like). In addition, a plurality of samples of a fourth type of label construction were prepared, said fourth type of label construction differing from said third type of label construction in that said fourth label construction included the acrylic adhesive layer of Example 1. Several samples of each type of label construction were tested one week after printing using the above-described 15 degree release test at room temperature. These samples were identified as "Room Temp." Another group of samples of each type of label construction were tested after heating at 110° C. for 20 minutes. These samples were identified as "110C/20 min." Another group of several samples of each label construction were heated in a 70° C. oven for 1 week with adhesive side up to prevent blocking and then tested. These samples were identified as "70C/1 week." The results of the above-described testing are shown graphically in FIG. 6.

EXAMPLE 7

Figure 7:
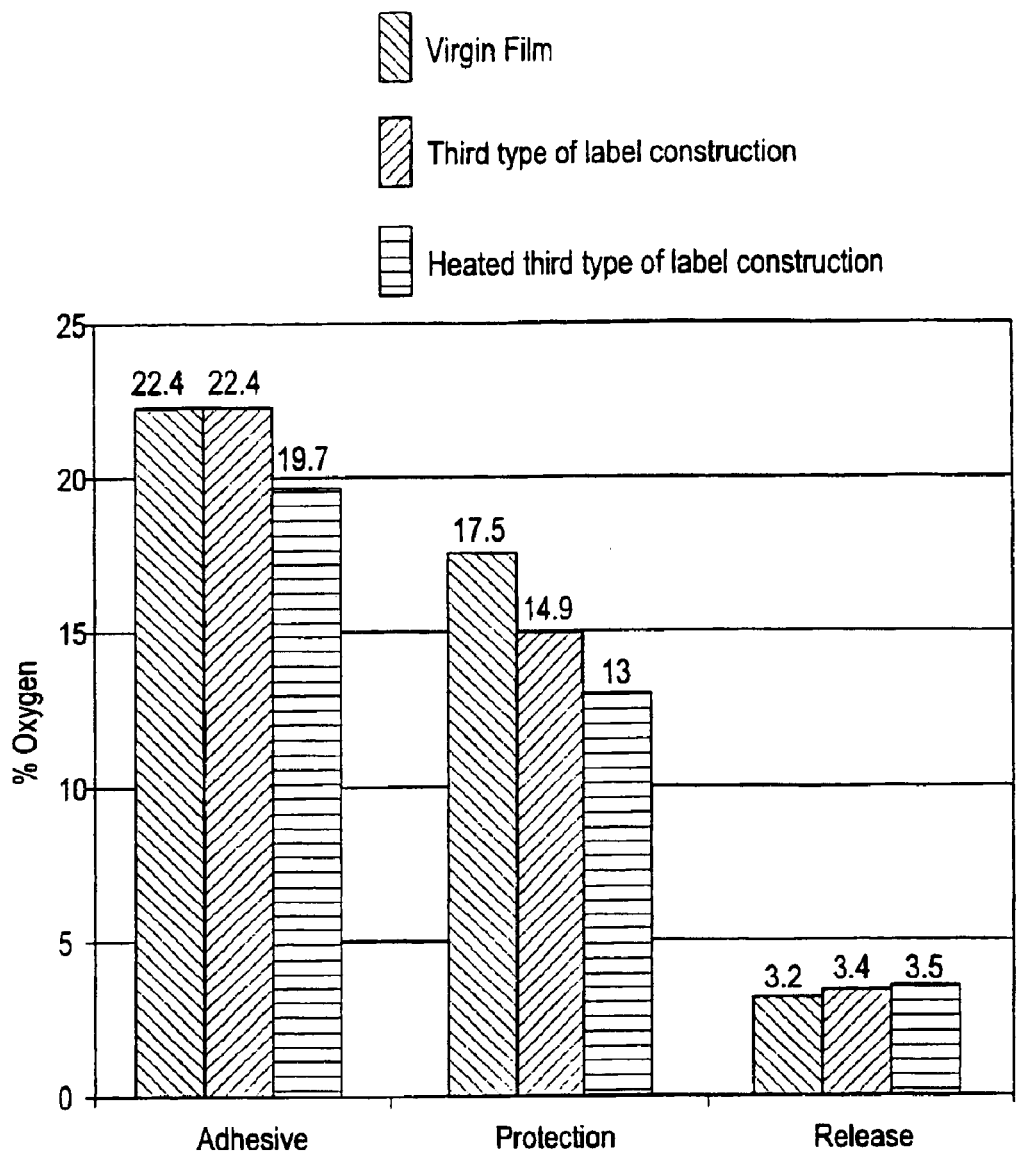
FIG. 7 is a graph depicting the surface oxygen content values obtained by X-ray photoelectron spectroscopy (XPS) in Example 7.

XPS measurements were obtained for the adhesive layer, the protective lacquer layer and the release coating of the support portion of the third type of label construction described in Example 6. The oxygen % values from these measurements are depicted graphically in FIG. 7. (Virgin film denotes the surface of the adhesive or protective lacquer material cast on a substrate or the virgin release coating without any material contamination.)

The embodiments of the present invention recited herein are intended to be merely exemplary and those skilled in the art will be able to make numerous variations and modifications to it without departing from the spirit of the present invention. For example, it should be appreciated that one may add, either directly or through trans-layer migration, trace or nonfunctional minor amounts of waxes or silicones to the release layer described herein as "non-wax" and "non-silicone" without being outside the scope of applicants' invention. Thus, the terms "non-wax" and "non-silicone" as used herein is intended to embrace this possibility. All such variations and modifications are intended to be within the scope of the present invention as defined by the claims appended hereto.

What is claimed is:

1. A heat-transfer label, said heat-transfer label comprising:
   (a) a support portion, said support portion comprising
      (i) a carrier, wherein said carrier is made of a polymer selected, from the group consisting of polyesters, polyolefins and polyamides, and
      (ii) a first release coating positioned over said carrier, said first release coating being made of a non-wax, non-silicone, thermoset release material, said first release coating having a total surface energy of about 25 to 35 mN/m, of which about 0.1 to 4 mN/m is polar surface energy, and being made by (A) applying to the carrier in its amorphous or semi-oriented state a composition comprising (1) a functionalized α-olefin containing copolymer and (2) a crosslinking agent; and (B) reacting said composition with the carrier during uniaxial or biaxial stretching and heat setting; and
   (b) a transfer portion, said transfer portion being positioned over said support portion for transfer of the transfer portion from the support portion to an article under conditions of heat and pressure, said transfer portion comprising
      (i) a protective lacquer layer, said protective lacquer layer being positioned over said first release coating, and
      (ii) an ink design layer, said ink design layer being positioned over said protective lacquer layer, and
      (iii) a heat-activatable adhesive layer positioned over said ink design layer;
   (c) whereby said first release coating separates cleanly from said transfer portion with no visually discernible portion of said release coating being transferred to the article along with the transfer portion.

2. The heat-transfer label as claimed in claim 1 wherein said first release coating has a total surface energy of about 30 mN/m, of which about 1.3 mN/m is polar surface energy.

3. The heat-transfer label as claimed in claim 1 wherein said first release coating is in direct contact with said transfer portion.

4. The heat-transfer label as claimed in claim 1 wherein said first release coating has a thickness of about 0.01 to 10 microns.

5. The heat-transfer label as claimed in claim 4 wherein said first release coating has a thickness of about 0.02 to 1 micron.

6. The heat-transfer label as claimed in claim 5 wherein said first release coating has a thickness of about 0.1 micron.

7. The heat-transfer label as claimed in claim 1 wherein said first release coating has a carbon content (by atomic %) of about 90 to 99.9% and an oxygen content (by atomic %) of about 0.1 to 10%, as measured by X-ray photoelectron spectroscopy.

8. The heat-transfer label as claimed in claim 7 wherein said first release coating has a carbon content (by atomic %) of about 97% and an oxygen content (by atomic %) of about 3%, as measured by X-ray photoelectron spectroscopy.

9. The heat-transfer label as claimed in claim 1 wherein said first release coating exhibits a release value of about 70–350 g/inch when an adhesive film which has been applied thereto is removed therefrom at a 15 degree angle using Scotch 810 tape at a rate of 12 in/min at room temperature.

10. The heat-transfer label as claimed in claim 9 wherein said first release coating exhibits a release value of about 125–200 g/inch when an adhesive film which has been applied thereto is removed therefrom at a 15 degree angle using Scotch 810 tape at a rate of 12 in/min at room temperature.

11. The heat-transfer label as claimed in claim 1 wherein said carrier is made of a polymer selected from the group consisting of polyethylene terephthalate and polyethylene napthylene.

12. The heat-transfer label as claimed in claim 1 wherein said carrier is made of a polymer selected from the group consisting of polyethylene and polypropylene.

13. The heat-transfer label as claimed in claim 1 wherein said functionalized α-olefin containing copolymer is an acid functionalized α-olefin containing copolymer.

14. The heat-transfer label as claimed in claim 13 wherein said acid functionalized α-olefin containing copolymer is selected from the group consisting of ethylene/acrylic acid copolymers; ethylene/methacrylic acid copolymers; ethylene/vinylacetate/acrylic acid terpolymers; ethylene/ methacrylamide copolymers; ethylene/glycidyl methacrylate copolymers; ethylene/dimethylaminoethyl methacrylate copolymers; ethylene/2-hydroxyethyl acrylate copolymers; and propylene/acrylic acid copolymers.

15. The heat-transfer label as claimed in claim 1 wherein said crosslinking agent is selected from the group consisting of amino formaldehyde resins, polyvalent metal salts, isocyanates, blocked isocyanates, epoxy resins and polyfunctional aziridines.

16. The heat-transfer label as claimed in claim 1 wherein said heat-activatable adhesive comprises a polyester resin.

17. The heat-transfer label as claimed in claim 16 wherein said heat-activatable adhesive further comprises a wax.

18. The heat-transfer label as claimed in claim 17 wherein said wax is a paraffinic wax.

19. The heat-transfer label as claimed in claim 1 wherein said protective lacquer layer comprises a phenoxy resin.

20. The heat-transfer label as claimed in claim 1 wherein said support portion further comprises a second release coating, said second release coating being positioned under said carrier.

21. The heat-transfer label as claimed in claim 20 wherein said second release coating is substantially identical in composition to said first release coating.

22. The heat-transfer label as claimed in claim 1 wherein said carrier and said first release coating are optically clear.

23. A transfer label comprising:
   (a) a support portion, said support portion comprising
      (i) a carrier, wherein said carrier is made of a polymer selected from the group consisting of polyesters, polyolefins and polyamides, and
      (ii) a first release coating positioned over said carrier, said first release coating being made of a non-wax, non-silicone, thermoset release material, said first release coating having a total surface energy of about 25 to 35 mN/m, of wich about 0.1 to 4 mN/m is polar surface energy, and being made by (A) applying to the carrier in its amorphous or semi-oriented state a composition comprising (1) a functionalized α-olefin containing copolymer and (2) a crosslinking agent; and (B) reacting said composition with the carrier during uniaxial or biaxial stretching and heat setting; and
   (b) a transfer portion, said transfer portion being positioned over said support portion for transfer of the transfer portion from the support portion to an article under conditions of heat and pressure, said transfer portion comprising
      (i) a protective lacquer layer, said protective lacquer layer being positioned over said first release coating, and
      (ii) an ink design layer, said ink design layer being positioned over said protective lacquer layer, and
      (iii) a heat-activatable adhesive layer positioned over said ink design layer;
   (c) whereby said first release coating separates cleanly from said transfer portion with no visually discernible portion of said release coating being transferred the article along with the transfer portion.

24. The transfer label as claimed in claim 23 wherein said first release coating has a total surface energy of about 30 mN/m, of which about 1.3 mN/m is polar surface energy.

25. The transfer label as claimed in claim 23 wherein said first release coating is in direct contact with said transfer portion.

26. The transfer label as claimed in claim 23 wherein said first release coating is a thickness of about 0.01 to 10 microns.

27. The transfer label as claimed in claim 26 wherein said first release coating has a thickness of about 0.02 to 1 micron.

28. The transfer label as claimed in claim 27 wherein said first release coating has a thickness of about 0.1 micron.

29. The transfer label as claimed in claim 23 wherein said first release coating has a carbon content (by atomic %) of about 90 to 99.9% and an oxygen content (by atomic %) of about 0.1 to 10%, as measured by X-ray photoelectron spectroscopy.

30. The transfer label as claimed in claim 29 wherein said first release coating has a carbon content (by atomic %) of about 97% and an oxygen content (by atomic %) of about 3%, as measured by X-ray photoelectron spectroscopy.

31. The transfer label as claimed in claim 23 wherein said carrier is made of a polymer selected from the group consisting of polyethylene terephthalate and polyethylene napthylene.

32. The transfer label as claimed in claim 23 wherein said carrier is made of a polymer selected from the group consisting of polyethylene and polypropylene.

33. The transfer label as claimed in claim 23 wherein said functionalized α-olefin containing copolymer is an acid functionalized α-olefin containing copolymer.

34. The transfer label as claimed in claim 33 wherein said acid functionalized α-olefin containing copolymer is selected from the group consisting of ethylene/acrylic acid copolymers; ethylene/methacrylic acid copolymers; ethylene/vinylacetate/acrylic acid terpolymers; ethylene/methacrylamide copolymers; ethylene/glycidyl methacrylate copolymers; ethylene/dimethylaminoethyl methacrylate copolymers; ethylene/2-hydroxyethyl acrylate copolymers; and propylene/acrylic acid copolymers.

35. The transfer label as claimed in claim 34 wherein said crosslinking agent is selected from the group consisting of amino formaldehyde resins, polyvalent metal salts, isocyanates, blocked isocyanates, epoxy resins and polyfunctional aziridines.

36. The transfer label as claimed in claim 25 wherein said protective lacquer layer comprises a phenoxy resin.

37. The transfer label as claimed in claim 23 wherein said support portion further comprises a second release coating, said second release coating being positioned under said carrier.

38. The transfer label as claimed in claim 37 wherein said second release coating is substantially identical in composition to said first release coating.

* * * * *

UNITED STATES PATENT AND TRADEMARK OFFICE
CERTIFICATE OF CORRECTION

PATENT NO. : 6,893,717 B1
APPLICATION NO. : 10/031,144
DATED : May 17, 2005
INVENTOR(S) : Tsai et al.

Page 1 of 2

It is certified that error appears in the above-identified patent and that said Letters Patent is hereby corrected as shown below:

Column 4,
Line 59, "Crivello et." should be -- Crivello et al. --.

Column 5,
Line 50, "0.02 tol micron," should be -- 0.02 to 1 micron, --.

Column 6,
Line 42, subparagraph (b) should be indented on the next line and should be lined up with subparagraph (a).

Column 7,
Line 21, "0.02 tol micron," should be -- 0.02 to 1 micron, --.

Column 8,
Line 13, "which is shown" should be -- which are shown --.
Line 19, "description," should be -- description --.

Column 9,
Line 22, "land" should be -- and --.
Line 36, "0.02 tol micron," should be -- 0.02 to 1 micron, --.
Line 54, "herein," should be -- herein --.

Column 10,
Line 18, "form" should be -- from --.

Column 11,
Line 48, "evaporate" should read -- evaporate(s) --.
Lines 48-49, the letter "(s)" in the word "evaporate(s)" is on a separate line. All letters of the word "evaporat(s)" should be on the same line.
Line 49, delete "(s)".

Column 12,
Line 19, "(ee" should be -- (see --.

Column 13,
Line 64, "24%" should be -- 2-4% --.

Column 14,
Line 67, "41" should be -- 4th --.

UNITED STATES PATENT AND TRADEMARK OFFICE
CERTIFICATE OF CORRECTION

PATENT NO. : 6,893,717 B1
APPLICATION NO. : 10/031,144
DATED : May 17, 2005
INVENTOR(S) : Tsai et al.

It is certified that error appears in the above-identified patent and that said Letters Patent is hereby corrected as shown below:

Column 16,
Line 48, "2" should be -- 20 --.
Lines 48-49, "0" in number 20 is on a separate line. Both digits of number 20 should be on the same line.
Line 49, delete "0".

Column 17,
Line 40, "is" should be -- are --.
Line 49, "selected," should be -- selected --.

Column 19,
Line 30, "wich" should be -- which --.
Line 52, "transferred the article" should be -- transferred to the article --.

Column 20,
Line 5, "is" should be -- has --.

Signed and Sealed this

Fourth Day of July, 2006

JON W. DUDAS
*Director of the United States Patent and Trademark Office*